United States Patent [19]

Guenther

[11] 4,185,931
[45] Jan. 29, 1980

[54] CIRCUIT ARRANGEMENT FOR DETERMINING THE POSITION OF A PRINTER CARRIAGE IN PRINTER DEVICES

[75] Inventor: Gerd J. Güenther, Munich, Fed. Rep. of Germany

[73] Assignee: Siemens Aktiengesellschaft, Berlin & Munich, Fed. Rep. of Germany

[21] Appl. No.: 899,870

[22] Filed: Apr. 25, 1978

[30] Foreign Application Priority Data

May 6, 1977 [DE] Fed. Rep. of Germany ....... 2720419

[51] Int. Cl.² ............................................. B41J 5/30
[52] U.S. Cl. ..................................... 400/705; 400/64
[58] Field of Search ................... 400/3, 4, 5, 6, 7, 15, 400/61, 62, 64, 70, 76, 280, 281, 705, 705.1, 705.2, 705.3, 279

[56] References Cited

U.S. PATENT DOCUMENTS 3,981,383  9/1976  Bittner et al. ............................ 400/64

FOREIGN PATENT DOCUMENTS 2556921  3/1977  Fed. Rep. of Germany .

Primary Examiner—Ernest T. Wright, Jr.
Attorney, Agent, or Firm—Hill, Van Santen, Steadman, Chiara & Simpson

[57] ABSTRACT

In an illustrative embodiment, a first advance signal is produced whenever a character is supplied to the keyboard control unit which is to be associated with advance of the printer carriage. Such a character may be shifted through a keyboard buffer storage, and then produce a second advance signal when it is transmitted to a receiving device for actually triggering a carriage advance. Second control signals are also produced in response to characters from other input units or which are received via a trunk line. A counter registers carriage position to be attained when the characters in the buffer have all been printed, for example by responding to second advance signals which are in addition to those due to characters from the buffer, and for responding to first control signals as a measure of characters being supplied via the buffer storage system. Alternatively, the second advance signals can also be the measure of characters supplied from the buffer.

7 Claims, 2 Drawing Figures

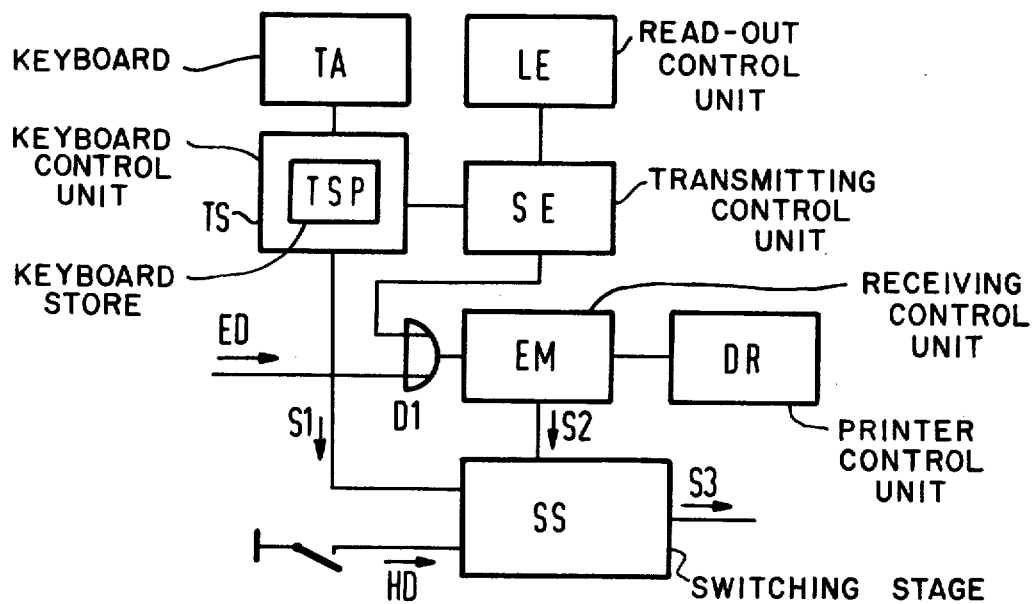
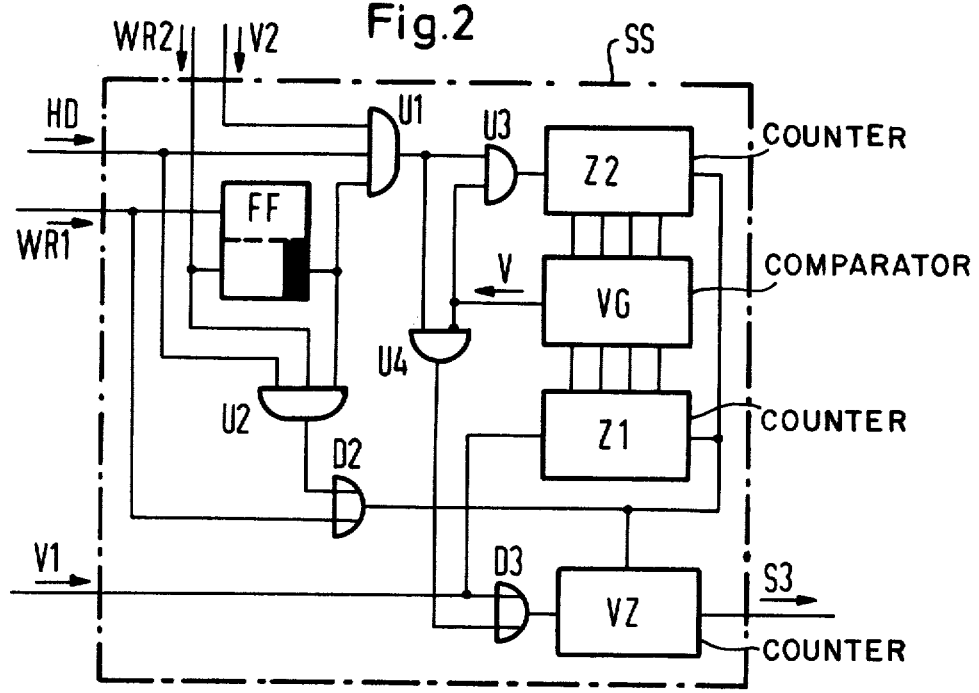

CIRCUIT ARRANGEMENT FOR DETERMINING THE POSITION OF A PRINTER CARRIAGE IN PRINTER DEVICES

BACKGROUND OF THE INVENTION

The invention relates to a circuit arrangement for determining the position of a printer carriage in printer devices, wherein a keyboard control unit which is connected to a keyboard, following each input of characters which trigger a motion of the printer carriage, by means of the keyboard, produces first control signal, wherein the keyboard control unit contains a keyboard store in which a plurality of input characters can be stored and wherein a receiving control unit which is connected via a transmitting control unit to the keyboard control unit and to further input units, and via a trunk line to a remote subscriber, following the reception of each character which triggers a motion of the printer carriage, produces second control signals.

A circuit arrangement provided with a counter stage for determining the position of a printer carriage is conceivable, wherein the counter stage counts those characters which are input by means of a keyboard of the printer device and which advance the carriage. Following the actuation of a key on the keyboard which triggers a return of the carriage into a starting position, the counting stage is in each case set to a commencing value. In this case the count of the counter stage represents an image of the position of the printer carriage of the printer device. If, however, the printer device also prints characters which have been input with the aid of a read-out device or a code generator or characters received from a remote subscriber, although the position of the carriage changes, the count of the counter stage remains unchanged. Following a change-over from readout operation, code generator operation or receiving operation to keyboard operation, the count of the counter stage can only be synchronized with the position of the printer carriage by the input of a command, which triggers a return motion of the carriage, by means of the keyboard.

It would also be conceivable, in a printer device, to count the control signals which are fed to the printer carriage and which produce a motion of the carriage, by means of a counter stage. In this case the counter stage is advanced irrespectively of whether the characters are input by means of a keyboard, a readout device or a code generator, or are received from a remote subscriber. If, however, the keyboard is provided with a keyboard store in which a plurality of input characters can be stored, the characters can be input considerably more rapidly than they can be printed out. In these circumstances it is not possible to gather from the contents of the counter stage how many characters can be additionally input in the row to be currently printed in addition to those characters already printed out and those characters stored in the keyboard store.

SUMMARY OF THE INVENTION

Therefore the aim of the invention is to provide a circuit arrangement with the aid of which the position of the printer carriage in printer devices is determined irrespectively of where the characters are produced and how many characters are stored in the keyboard store.

In accordance with the invention, the aim is realized in the circuit arrangement of the type described in the introduction in that a switching stage is provided which is fed with the first control signals and the second control signals and which contains a counter stage which, by means of the second control signals and taking into consideration the first control signals, produces signals assigned to the position of the printer carriage.

The circuit arrangement corresponding to the present invention has the advantage that the count of the counter stage always precisely indicates the position to be assumed by the printer carriage even when the characters are alternately input by means of the keyboard, the readout device or the code generator, or are received from a remote subscriber. The number of characters stored in the keyboard store is additionally taken into consideration in the determination of the position of the printer carriage. A further advantage of the circuit arrangement consists in that in the transmission of characters input by the keyboard following a reception of characters or following the transmission of characters input by means of the readout device or the code generator, it is unnecessary to achieve a synchronism between the count of the counter stage and the position of the printer carriage.

The signals assigned to the position of the printer carriage are produced in a particularly simple manner if the counter stage processes the first control signals and those of the second control signals which are not assigned to the first control signals.

If the first and second control signals are formed from first and second advance signals respectively, which serve to advance the printer carriage, and first and second carriage return signals which serve to trigger a return to the carriage into a starting position, those of the second control signals which are not assigned to the first control signals are advantageously switched through if the switching stage contains a first and second counter which serve to count the first and second advance signals respectively, and a comparator which releases the second counter and blocks the switch-through of the second advance signals to the counter stage for such time as the count of the first counter is higher than that of the second counter.

In order to prevent the counter stage being advanced or reset by the second control signals produced by the receiving control unit following a resetting by the first carriage return signal, it is favorable for the switching stage to contain a flip-flop which is set by the first carriage return signal and is reset by the second carriage return signal and which blocks the switch-through of the second control signals to the counter stage when the latter is set.

A switch-through of the second advance signals is achieved in a simple manner if the switching stage contains an AND-gate whose inputs are fed with the second advance signal and the signal present at the output of the comparator, and whose output is connected to the counting input of the counter stage via an OR-gate which switches through the first advance signals.

In order to block the second counter it is advantageous to precede the counting input of the second counter by an AND-gate whose inputs are fed with the second advance signals and with the signal present at the output of the comparator.

In the following an exemplary embodiment of the circuit arrangement in accordance with the invention will be described making reference to an exemplary embodiment illustrated in the accompanying sheet of drawing; other objects, features and advantages will be apparent from this detailed disclosure and from the appended claims.

BRIEF DESCRIPTION OF THE DRAWING

FIG. 1 is a block circuit diagram of a printer device; and

FIG. 2 is a circuit diagram of a switching stage provided in the printer device.

DETAILED DESCRIPTION

The printer device illustrated in FIG. 1-for example a teleprinter-contains a keyboard TA, with which characters to be printed out by the printer and control signals for the printer, can be input. The keyboard TA is connected to a keyboard control units TS which on the one hand forwards the characters and control signals to a transmitting control unit SE, and on the other hand feeds control signals S1 to a switching stage SS which is provided in order to determine the position of the printer carriage of the printer device. The keyboard control unit TS is provided with a keyboard store TSP which can store a plurality of characters and the contents of which is taken into account in determining the position of the printer carriage. The control signals S1 are advance signals V1 which are produced whenever characters serving to advance the printer carriage of the printer device are input by means of the keyboard TA. In the following these characters will be referred to as advance characters. Other control signals S1 are carriage return signals WR1 which occur whenever a command to return the printer carriage into a starting position or to produce a new row is input by means of the keyboard. TA. The transmitting control unit SE is connected not only to the keyboard control unit TS but also to a readout control unit LE with the aid of which data can be input by means of readout devices, such as for example punched tape or magnetic tape devices or by means of a code generator. The transmitting control unit SE contains a parallel-series converter and at its output feeds the characters input by means of the keyboard TA or the read-out control unit LE via a OR-gate D1 to a receiving control unit EM. Via the OR-gate D1, the receiving control unit EM is also supplied with serial-coded data ED received from a remote subscriber via a trunk line. The receiving device EM contains a series-parallel converter, and at its output feeds a printer control unit DR with parallel-coded characters for printout. Similarly to the keyboard control unit TS, the receiving control unit EM emits control signals S2 for determining the position of the printer carriage, to the switching stage SS. Whenever an advance character is recognized in the receiving control unit EM, an advance signal V2 is produced as control signal S2 and whenever a command to return the carriage into the starting position or to produce a new row is recognized, the receiving control unit EM produces a carriage return signal WR2.

The switching stage SS illustrated in FIG. 2 contains a counter stage VZ which, when characters are input by means of the keyboard TA, counts the advance signals V1 and which is reset by the carriage return signal WR1. When characters are input exclusively by means of the keyboard TA, a block is imposed upon the advance signals V2 and the carriage return signals WR2 which are produced by the receiving control unit EM whenever the characters pass from the keyboard control unit TS via the transmitting control unit SE to the receiving control unit EM. If the receiving control unit EM receives characters input by means of the read-out control unit LE or characters transmitted from the remote subscriber, the control signals V2 and WR2 which it emits are processed in the counter stage VZ. In this case the counter stage VZ is advanced by the advance signals V2 and reset by the carriage return signal WR2.

If characters reach the receiving control unit EM alternately from the keyboard TA and via the readout control unit LE and the trunk line, the control signals V1 and WR1 produced by the keyboard control unit TS are switched through to the counter stage VZ. Only those of the control signals V2 and WR2 produced in the receiving control unit EM which are not assigned to respective control signals V1 and WR1 are switched through to the counter stage VZ. In any case signals S3 assigned to the position of the printer carriage are emitted from the output of the counter stage VZ of switching stage SS.

If, during the input of characters by means of the keyboard TA, a command to return the carriage is initially input, the keyboard control unit TS produces the carriage return signal WR1 which resets the counter stage VZ to a starting value via an OR-gate D2. The carriage return signal WR1 also resets two counters Z1 and Z2 in the switching stage SS to a starting value. It also sets a flip-flop FF. A signal present at the inverting output of the flip-flop FF blocks two AND-gates U1 and U2.

Following the occurrence of the carriage return signal WR1, the printer carriage occupies the starting position and the counter stage VZ has the starting value, for example the count 0, which is assigned to the starting position. If advance characters are input by means of the keyboard TA, the keyboard control unit TS produces the advance signals V1 which advance the counter stage VZ via an OR-gate D3 and are also fed to the counting input of the counter Z1. Following a delay time, the characters which have been input by means of the keyboard TA pass via the keyboard control unit TS, the transmitting control unit SE, and the receiving control unit EM to the printer control unit DR where they are printed out, involving a shift of the printer carriage. The receiving control unit EM produces a carriage return signal WR2 which is assigned to the carriage return signal WR1 but, since the AND-gate U2 is blocked, is not switched through to the resetting input of the counter stage VZ. After a predetermined delay time, the carriage return signal WR2 resets the flip-flop FF. The signal present at the inverting output of the flip-flop FF thus releases the AND-gates U1 and U2. Here it has been assumed that the printer device is operated in semiduplex and a signal HD fed to the AND-gates U1 and U2 has the binary value 1.

The receiving control unit EM recognizes the advance characters which have been input by means of the keyboard system TA, TS and produces advance signals V2 assigned to the advance signals V1. The advance signals V2 are fed to two AND-gates U3 and U4. The two counters Z1 and Z2 are connected to one another via a comparator VG. This comparator VG constantly compares the count of the two counters Z1 and Z2. When the count of the counter Z1 is higher than that of the counter Z2, it emits a signal V having the binary value 1 from its output. Otherwise the signal V has the binary value 0. When the counter Z2 has not yet counted an advance signal V2 and when the counter Z1 has counted at least one advance signal V1, the signal V has the binary value 1. The signal V when exhibiting a binary one value blocks the AND-gate U4 and the advance signals V2 are unable to reach the counter stage VZ. This prevents the advance characters being doubly counted. Whenever the signal V blocks the AND-gate U4, it opens the AND-gate U3. The advance signals V2 thus reach the counter Z2. As, however, when characters are input by means of the keyboard TA, no more advance characters can occur in the receiving control unit EM than have been input by the keyboard TA, the count of the counter Z2 cannot be greater than that of the counter Z1, and when characters are input exclusively by means of the keyboard TA, the AND-gate U4 remains blocked for the advance signals V2. When all the advance characters have been fed to the printer control unit, the counters Z1 and Z2 possess the same count and the signal V has the binary value 0. The AND-gate U4 is thus opened and the AND-gate U3 is blocked.

If, following the input of characters by means of the keyboard TA, the receiving control unit EM receives characters which are input by means of the readout control unit LE and have been produced for example in a readout device or in a code generator or have been transmitted from a remote subscriber, the receiving control unit EM produces control signals assigned to these characters. If, for example, advance characters are initially produced, the receiving control unit EM emits advance signals V2. As the AND-gate U3 is blocked, the counts of the counters Z1 and Z2 remain unchanged. The signal V has the binary value 0 and continues to release the AND-gate U4. The advance signals V2 are thus switched through via the OR-gate D3 to the switching stage VZ and the count of the counter stage VZ is increased in a manner corresponding to that in which the printer carriage is displaced by the advance characters in the printer control unit DR.

Thus the count of the counter VZ portrays the position of the printer carriage in the printer control unit DR when characters are input alternately by means of the keyboard TA or by means of the readout control unit LE or are received from a remote subscriber. If the receiving control unit EM recognizes a command which triggers a return of the printer carriage, it produces the carriage return signal WR2 which is switched through via the AND-gate U2 and the OR-gate D2 to the resetting input of the counter stage VZ. When the appropriate command has been input by means of the keyboard TA, the carriage return signal WR1 resets the counter stage VZ to its starting value in the same way as the carriage return signal WR2. The counters Z1 and Z2 are also reset to their starting values.

If, following the input of characters by means of the readout control unit or following the reception of characters, characters are again input by means of the keyboard TA, on the occurrence of advance characters the keyboard control unit TS again produces advance signals V1 which advance the counter stage VZ. At the same time, the counter Z1 is advanced and its count thus again becomes greater than that of the counter Z2. When the appropriate advance characters pass via the transmitting control unit SE to the receiving control unit EM and the latter produces the advance signals V2, the switch-through of the advance signals V2 to the counter stage VZ is again prevented by means of the AND-gate U4.

The switching stage SS proves particularly advantageous when the keyboard control unit TS is provided with a keyboard store TSP in which a plurality of characters are stored. As the characters can be input by means of the keyboard TA considerably more rapidly than they can be printed out by the printer control unit DR, the counter stage VZ can emit a bell signal indicating the end of a row as soon as a corresponding number of characters have been input by means of the keyboard TA. In this case, the printer carriage would not yet for example occuppy the position assigned to the bell signal.

It is also possible to produce signals S3 assigned to the position of the printer carriage when the counter stage VZ is formed from a counter which counts the advance signals V2 and from an adder which adds the number of advance characters stored in the keyboard store TSP to the count of this counter. This number is determined, for example, by means of the counter Z1 which is then formed as an upwards-downwards counter and which counts upwards whenever advance signals V1 occur and is caused to count downwards by a signal contained in the control signals S1 whenever advance characters are transferred from the keyboard control unit TS out of the keyboard store TSP to the transmitting control unit SE.

In this case, from the output of the counter stage VZ there are emitted signals S3 which are likewise assigned to the position of the printer carriage and which are produced by means of the control signals S2 and taking into account the control signals S1 in the switching stage SS.

For further information on an exemplary keyboard control unit containing a keyboard buffer storage, reference may be made to German published application No. P25 56 903.3 (filed Dec. 17, 1975) and German Auslegeschrift 25 56 921 dated Mar. 10, 1977. As is apparent from the latter publication, the signal S3 may include a signal from a decoder when the counter VZ reaches a count less than the count corresponding to a full line of character positions. For example a warning sound may be generated when counter VZ reaches a count of seventy-two, where a full line corresponds to eighty character positions.

It will be apparent that many modifications and variations may be effected without departing from the scope and the novel concepts and teachings of the present invention.

I claim as my invention:

1. A circuit arrangement for determining the position of a printer carriage in printer devices wherein a keyboard is operable to produce advance characters which are to trigger advance of the printer carriage, and a keyboard control unit is connected to the keyboard and produces first control signals following each input of one of such advance characters, and wherein the keyboard control unit has a keyboard store for storing a plurality of such advance characters, and wherein a receiving device connected to the keyboard store produces second control signals following the reception of each advance character from the keyboard control unit or other source of advance characters, characterized in a switching stage (SS) being provided which is fed with the first control signals (S1) and the second control signals (S2) and having a counter stage (VZ) which, by means of the second control signals (S2), and taking into account the first control signals (S1) produces signals (S3) assigned to the position of the printer carriage.

2. A circuit arrangement as claimed in claim 1, characterized in that the counter stage (VZ) processes the first control signals (S1) and those of the second control signals (S2) which are not assigned to the first control signals (S1).

3. A circuit arrangement as claimed in claim 1 or 2, wherein the first and second control signals (S1, S2) comprise first and second advance signals (V1, V2) respectively which are associated with advance characters, and first and second carriage return signals (WR1, WR2) which trigger a return of the printer carriage into a starting position, characterized in that the switching stage (SS) contains a first and a second counter (Z1, Z2) which count the first and second advance signals (V1, V2) respectively, and a comparator (VG) which releases the second counter (Z2) and blocks the switch-through of the second control signals (V2, WR2) to the counter stage (VZ) for such time as the count of the first counter (Z1) is higher than that of the second counter (Z2).

4. A circuit arrangement as claimed in claim 3, characterized in that the switching stage (SS) contains a flip-flop (FF) which is set by the first carriage return signal (WR1) and is reset by the second carriage return signal (WR2) and which blocks the switch-through of the second control signals (V2, WR2) to the counter stage (Z2) when said flip-flop is set.

5. A circuit arrangement as claimed in claim 3, characterized in that the switching stage (SS) contains an AND-gate (U4), whose inputs are fed with the second advance signal (V2) and with the signals (V) present at the output of the comparator (VG), and whose output is connected to the counting input of the counter stage (VZ) via an OR-gate (D3) which also transmits the first advance signals (V1).

6. A circuit arrangement as claimed in claim 3, characterized in that the counting input of the second counter (Z2) is preceded by an AND-gate (U3) having inputs fed with the second advance signals (V2) and with the signal (V) present at the output of the comparator (VG).

7. A circuit arrangement for determining the position of a printer carriage in printer devices wherein first control signals are produced during input of characters to a keyboard store whenever the characters are to be associated with movement of the printer carriage, and wherein second control signals are produced following reception of each such character from the keyboard store or from other sources, said circuit arrangement being characterized in comprising a switching stage (SS) for receiving the first control signals (S1) and the second control signals (S2), and having a counter stage (VZ) which is advanced in accordance with each of the second control signals (S2) which is in addition to the second control signals produced by the characters supplied from the keyboard store, and which is also advanced in accordance with control signals (e.g. S1) representing the number of characters supplied by the keyboard store and the number of characters in the keyboard store.

* * * * *